W. B. CHENOWETH.
WIND MOTOR.
APPLICATION FILED JULY 5, 1921.
1,408,988.
Patented Mar. 7, 1922.
3 SHEETS—SHEET 3.
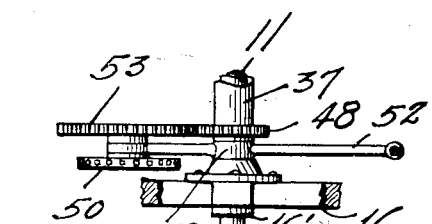
Fig. 8
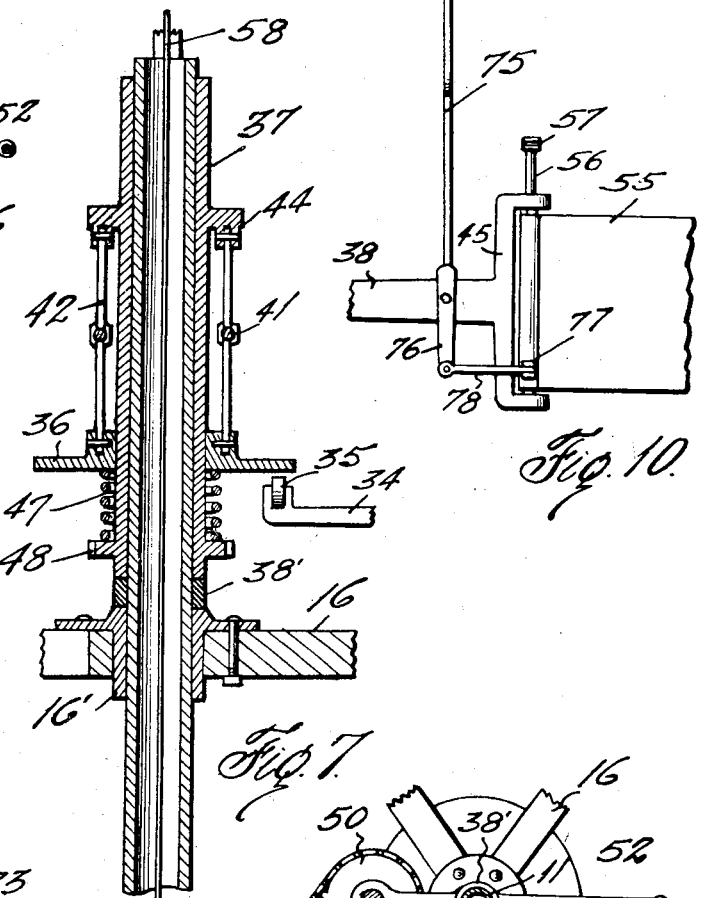
Fig. 7
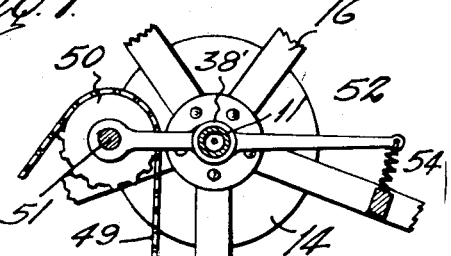
Fig. 10
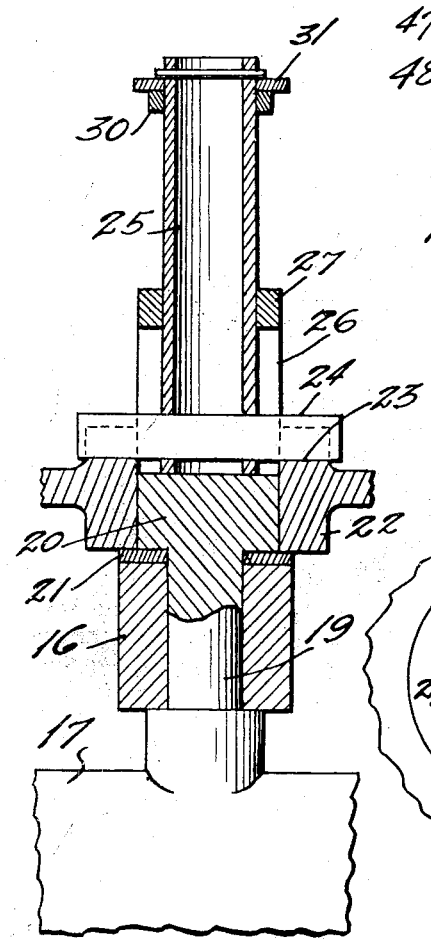
Fig. 6
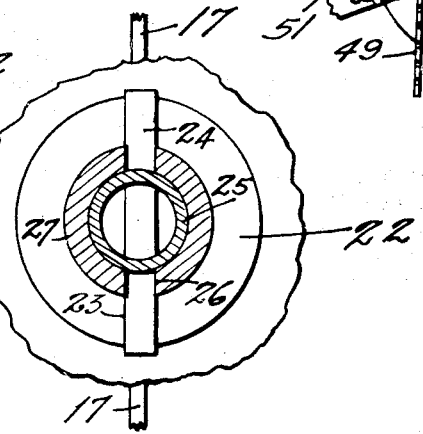
Fig. 5
Fig. 9
Inventor
W. B. Chenoweth.
By Jack A. Ashley
Attorney

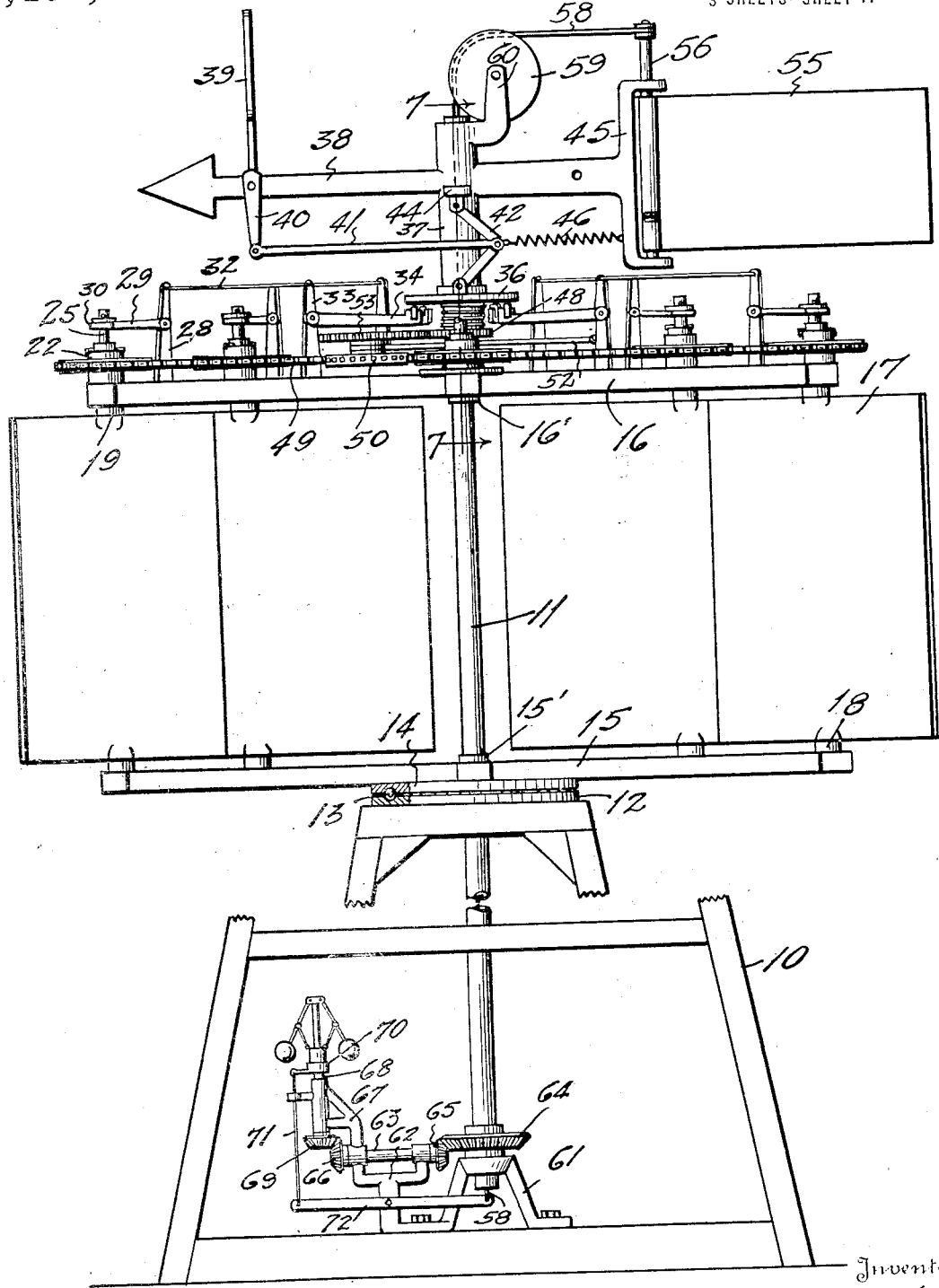

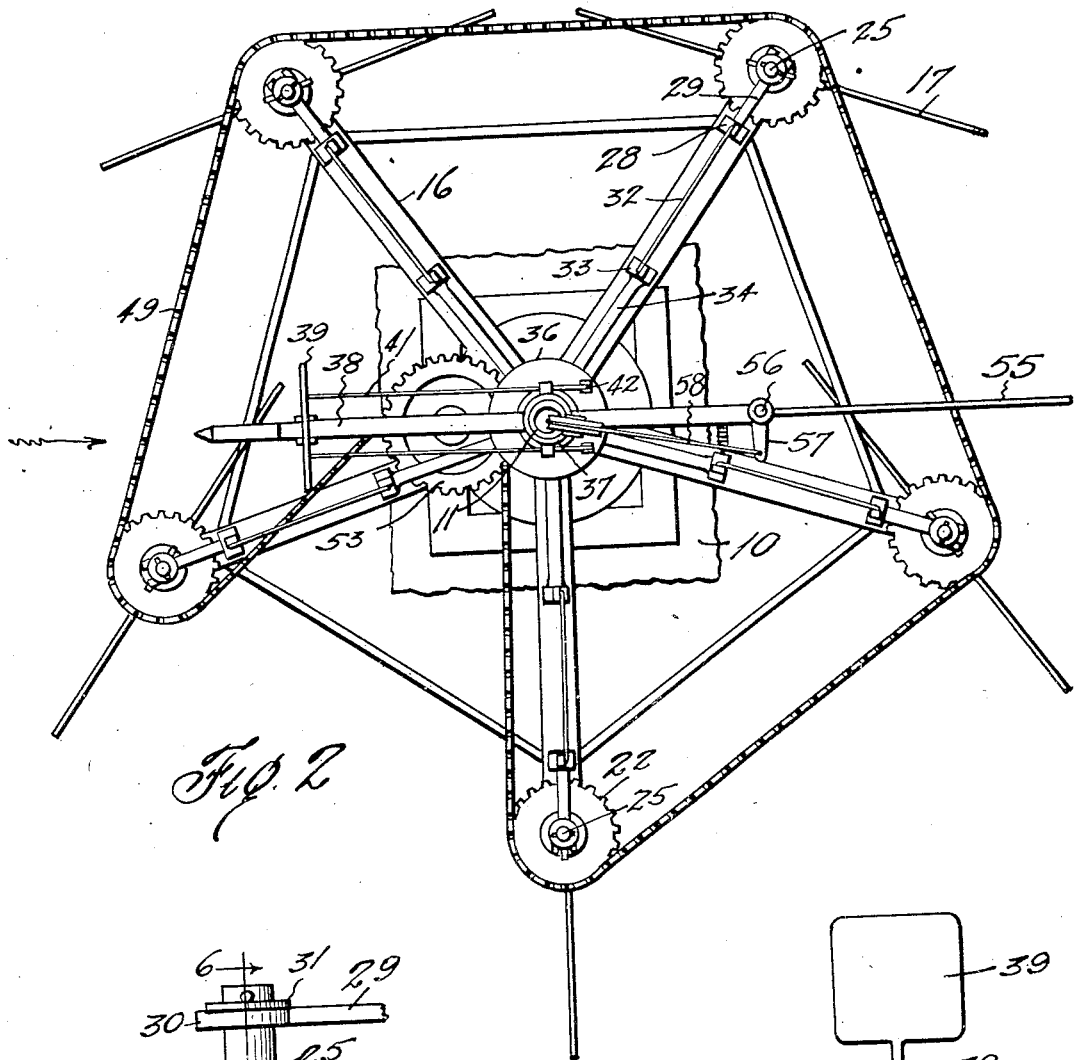
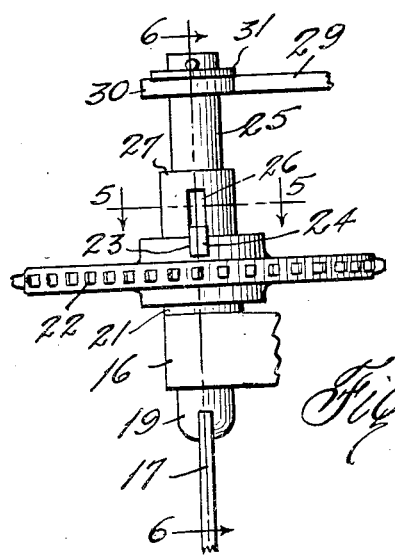
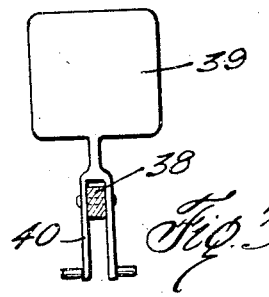

UNITED STATES PATENT OFFICE.

WILLIAM B. CHENOWETH, OF DALLAS, TEXAS, ASSIGNOR TO NATIONAL ATMOSPHERIC POWER & LIGHT COMPANY, OF DALLAS, TEXAS, A TRUST ESTATE.

WIND MOTOR.

1,408,988.  Specification of Letters Patent.  Patented Mar. 7, 1922.

Application filed July 5, 1921. Serial No. 482,332.

*To all whom it may concern:*

Be it known that I, WILLIAM B. CHENOWETH, a citizen of the United States, residing at Dallas, in the county of Dallas and State of Texas, have invented certain new and useful Improvements in Wind Motors, of which the following is a specification.

This invention relates to new and useful improvements in wind motors.

The object of the invention is to provide a wind motor which is automatically controlled and involves a rotating power member having pivoted blades or wings. A particular object is to provide automatic means to be actuated by a storm or high velocity of wind to release the wings, whereby they will be presented edgewise to the wind and the motor saved from damage under such conditions.

Another aim of the invention is to provide a wind motor which will operate at substantially the same rate of speed under various wind pressures. A further feature resides in the provision of self positioning blades or wings. A still further object of the invention is to provide a structure which will require but minimum attention during its operation.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is an elevation of a motor constructed in accordance with my invention,

Fig. 2 is a plan view of the same,

Fig. 3 is an elevation of the releasing target,

Fig. 4 is a detail of one of the wing clutches,

Fig. 5 is an enlarged cross sectional view on the line 5—5 of Fig. 4,

Fig. 6 is an enlarged vertical sectional view on the line 6—6 of Fig. 4,

Fig. 7 is an enlarged vertical sectional view on the line 7—7 of Fig. 1,

Fig. 8 is a detail in elevation of the wing swinging gears,

Fig. 9 is a plan view of the same, and

Fig. 10 is an elevation of a modified form of feed controlling means.

In the drawings the numeral 10 designates a tower of suitable construction. A tubular shaft 11 extends vertically through the tower and above the same. A bearing ring 12 is mounted on top of the tower in concentric relation to the shaft and has ball bearings 13 which carry a supporting ring 14. On the ring 14 is mounted a spider 15 comprising radial arms and having a hub 15' which embraces the shaft 11. An upper spider 16 is disposed on a hub 16' above the first spider and is likewise fastened to said shaft. The radial arms of the top spider overhang the arms of the bottom spider.

Between each pair of upper and lower spider arms a vertical wing 17 is pivoted. Each wing has a shouldered trunnion 18 at its bottom suitably pivoted in the outer end of one of the spider arms of the lower spider 15. For the sake of clearness one of the wings 17 has been omitted from Fig. 1. Each wing has at its upper end a pivot stub 19, as is best shown in Figs. 4 and 6. Each stub is vertically alined with its underlying trunnion and these are slightly offset from the center of the wings, so that the greater area of each wing is disposed inwardly of its vertical axis and unless restrained, said wing would thus be overbalanced and swung parallel to the direction of travel of the air current striking thereupon.

Each stub 19 is shouldered and has its reduced portion passing through one of the arms of the spider 16. An enlarged head 20 is provided on the upper end of each stub and is supported on a bearing washer 21 mounted on said arm. Each head 20 is loose in the hub of a sprocket wheel 22 and this hub is provided with diametrically opposite slots 23 adapted to receive a transverse clutch bar 24 penetrating the lower end of a tubular pin 25 and sliding vertically in slots 26 provided in a sleeve 27. Each sleeve 27 is attached to one of the heads 20 and may form a part thereof.

It will be seen by observing Figures 4, 5 and 6, that when a clutch bar 24 is in engagement with the slots 23, of the clutch hub of a sprocket, the rotation of said sprocket will impart rotation to the blade to which it is connected, but if the attached pin 25 is elevated the bar 24 will be withdrawn from the slots 23 and the blades may swing independently of said sprockets. By providing means to lift the bars 24 when a certain wind velocity is reached, the overbalanced blades will be released and may turn edgewise to the air current.

Near each sprocket 22 a vertical lever 28 has its lower end pivoted into the spider arm and intermediate its ends it has an outwardly directed arm 29 having a fork 30 at its outer end receiving the adjacent pin 25. Each pin 25 is suitably supported by a washer 31 resting on one of the forks, whereby the pin is free to rotate. Each lever 28 has its upper end connected with a link 32 which is disposed over the spider arm and has its inner end connected with the upper end of a circuit lever 33 having its lower end pivoted to said arm. Each lever 33 has an inwardly directed arm 34 carrying an upstanding roller 35 on its inner end. The rollers 35 are located immediately under a disk 36, which is arranged to be depressed to engage said rollers and swing the arms 34 downwardly, whereby the levers 33 are swung inwardly and through the agency of the links 32 swing the levers 28 inwardly to raise the arms 29 to elevate the pins 25, whereby the wings 17 are unclutched.

On the upper end of the tubular shaft is mounted a sleeve 37, which is supported at its lower end on a collar 38' which surrounds said shaft and rests upon the hub 16' of the upper spider 16. The tubular shaft rotates within said sleeve. The sleeve is disposed intermediate the ends of a wind vane 38 which is integral with said sleeve. On the forward end of the vane an upright target 39 is pivoted. This target has its lower end 40 formed into a fork so as to straddle the vane and depend below the same. From each side of the fork a link 41 extends inwardly toward the sleeve and is pivoted at its inner end to a knuckle joint 42 fastened at its upper end to a lug 44 on the side of the sleeve and having its lower end pivoted to the disk 36. The rear end of the vane is provided with an upright yoke 45. A tension spring 46 extends from each knuckle joint to the yoke and these springs are arranged so as to be tensioned to resist a certain wind pressure.

Normally the target 39 is held in an upright position and the knuckle joints are collapsed as shown in Fig. 1. The disk 36 is supported by a coiled spring 47, which surrounds the sleeve 37 and rests upon a gear ring 48 made integral with said sleeve. The spring 47 normally supports the disk 36 above the rollers 35. As the wind pressure on the target 39 is not sufficient to overcome the tension of the springs 46 and 47, said target remains in an upright position and the wing clutches are interchangeable. Should however, the wind reach such a velocity, due to a storm or otherwise, as to swing the target 39 inwardly, the knuckle joint 42 would be expanded. When the knuckle joints 42 are expanded the disk 36 will be forced downwardly thus depressing the arms 34 and lifting the clutch bars 24 as has been hereinbefore described. From this it will be seen that the control of the device is automatic and adequate means is provided to prevent the destruction of the motor by a high wind.

To obtain the best result the wings 17 should always be presented at a certain angle and in order to do this, said wings must be rotated as the motor rotates. In carrying out this feature a sprocket chain 49 passes around the wheels 22 and is carried inwardly between two of said wheels in a loop which is engaged over a driving sprocket 50. As is best shown in Figs. 8 and 9, the sprocket 50 is mounted on a short shaft 51 which is journaled in the end of a shaft 51, which latter is secured to the collar lever 52, which latter is secured to the collar 38 intermediate its ends. The sprocket 50 is on the underside of said lever and upon the upperside of said lever a worm gear 53 is fastened on the shaft 51 and engages the gear ring 48. The lever 52 has its opposite end connected with a short coiled spring 54 which is attached to one of the arms of the spider 16 and thus when said spider is revolved the lever is carried around therewith, whereby the gear 53 is caused to travel around the gear ring 48, which latter is held stationary by the spring 37.

It will be seen that any rotative movement of the sleeve is dependent upon the vane 38. This vane as is usual is headed into the wind and is provided with a rudder blade 55 mounted on a vertical post 56 which is journaled in the yoke 45. The post 56 has a laterally extending arm 57 on its upper end from the outer end of which a flexible connection such as a cable 58, extends. A pulley 59 is mounted in a bracket 60 on the upper end of the sleeve 37. The cable 58 passes over the pulley 59 and down through the tubular shaft 11.

The lower end of the shaft 11 is mounted in a standard 61 which is connected with a bracket 62 supporting a radial counter shaft 63. A driving gear 64 which is preferably beveled, is fastened on the shaft 11 and power may be taken from this wheel in any suitable manner. The gear 64 meshes with a pinnion 65 on the inner end of the shaft 63, which latter has a miter gear 66 on its outer end. The bracket 62 supports a hanger 67 in which a vertical governor shaft 68 is mounted. A miter gear 69 on the lower end of the shaft 68 meshes with the pinion 66. An ordinary governor construction having a sliding collar 70 is mounted for rotation on the shaft 68. The collar 70 is connected with the upper end of a rod 71 which has its lower end pivoted to the outer end of the lever 72 which is pivoted on the bracket 62.

The inner end of the lever extends under the shaft 11, and is connected with the lower end of the cable 58.

The rudder blade 55 is normally disposed in alinement with the vane 38, and the governor is arranged so as to acquire a certain speed without having any effect upon the collar 70. However, when the speed rises in excess of this point the centrifugal action of the governor will raise the collar 70, whereby the rod 71 will be moved upwardly and the lever 72 swung. When the lever 72 is swung its inner end is carried downwardly and the cable 58 is pulled. The pulling of the cable 58 swings the rudder 55 out of line with the vane 38. The result of this is to change the angular position of the vane which causes a slight rotation of the sleeve 37 and a consequent turning of the gear ring 48. When the gear ring 48 turns it has an adjusting effect on the gear 53 and the chain 49. The result of this adjustment is to straighten the wings 17 so that they are presented at a more acute angle to the wind and thus the rotation of the motor is slowed up as will be obvious. When the speed has been reduced the governor permits the collar 70 to lower, whereby the rudder 55 is permitted to swing into line with the vane 38 and the blades readjusted so as to present themselves at a wider angle to the wind.

In operation the wings 17 are disposed so as to be acted upon by the wind in the most efficient manner. Referring to Fig. 2, it will be seen that the vane 38 points in the direction of the wind and the motor rotates to the left. The chain 49 and the sprocket wheels 22 are so mounted as to rotate each wing once during each two rotations of the motor, but to swing each wing into the same position during each rotation of the motor. The wings are not brought to fully face the wind until each is substantially at right angle to the direction of the wind. The wings successively move in and out of the various positions and in this way reduce resistance and back pressure. Each wing is constantly disposed at such angularity to the direction of the wind as to give the most efficient result to produce a maximum power, except when altered by the governor to reduce the speed.

A motor of this type is particularly adapted for operating an electric current generator and it is obvious that a steady speed of operation is highly essential. An excessive speed developed by the motor would burn out the generator and a very high wind would destroy the motor itself. It is to be understood that the use of this motor is not limited to generating purposes and it may be used wherever found desirable; however, when operating a generator and other machines it must be automatically controlled to prove satisfactory. Should the wind shift the vane 38 will cause the motor to shift correspondingly. Should the speed of rotation become excessive the governor will raise the collar 70 whereby the lever 72 will be swung which will result in the lateral displacement or swinging of the rudder 55 by means of the cable 58. This will cause the vane 38 to swing slightly out of the wind and rotate the sleeve 37. When the sleeve 37 is rotated the ring gear 48 will be turned and consequently will move relatively of the rotation of the gear 53, thus resulting in a shifting of the angularity of the blades 17 by reason of the chain 49 and the sprockets 22. This shifting of the blades will dispose them at a more acute angle to the direction of the wind and thus retard the rotation of the motor. When the governor assumes its normal position the rudder 55 will be returned to alinement with the vane 38 and the sleeve 37 rotated in a reverse direction, whereby the wings 17 will be returned to their normal positions.

Should a storm wind or a wind of high velocity be encountered, the target 39 will be swung inwardly whereby the link 41 will be pulled outwardly and the knuckle joint 42 is expanded against the tension of the springs 46. The expansion of the knuckle joints will force the disk 36 downwardly against the tension of the spring 47, so that said disk will bear on the rollers 35 and depress the arms 34 as the motor rotates. The arms 34 swing the levers 33 which swing the arms 29 upwardly through the agency of the levers 28 and the link 32. When the arms 29 are swung upwardly they lift the pins 25 whereby the clutch bars 24 are lifted from the slots 23 of the sprocket wheels 22. This permits the stub 19 and the wings 17 to turn freely. The wings being pivoted off center and thus overbalanced will when freed, turn edgewise to the wind so that the motor will cease to rotate and offer substantially no resistance to the wind. When the velocity of the wind reduces sufficiently to allow the target 39 to swing to an upright position, the clutch bars 24 will be lowered so as to drop into the slots 23 when the wings 17 are rotated as will be obvious. In this way the wings are automatically brought into proper position and the motor may be easily started by imparting rotation thereto.

In Fig. 10, I have shown a modified form of construction to be used in place of the governor and the cable 58. This modified form consists of an upright target 75 which has its lower end 76 forked and straddling the rear end of the vane 38 on which it is pivoted. The rudder 55 is provided with a laterally extending arm 77, which is connected with the fork 76 by means of a link 78. As the speed of rotation of the motor is due more or less to the velocity of the wind, operation of the target 75 by the wind will control the speed of the motor. Any suitable means may be employed for holding the target 75 in an upright position until overcome by a predetermined wind pressure. When the target 75 is swung rearwardly the link 78 is pulled forwardly or inwardly, whereby the rudder 55 is swung to one side and the vane 38 caused to shift as hereinbefore described.

Various changes in the dimensions and construction as well as modifications may be made, without departing from the spirit of the invention.

What I claim, is:

1. In a wind motor, a vertical shaft, supports mounted on the shaft and rotating therewith, vertical wings pivoted on the supports, means for rotating the wings independently of the supports, clutches connecting the wings with their rotating means, means for operating the clutches to release the wings, and a wind actuated member connected with the clutch operating means for operating the latter.

2. In a wind motor, a vertical shaft, supports mounted on and rotating with the shaft, vertical wings pivoted on the supports, means for rotating the wings, clutches connecting the wings and the rotating means, a vane mounted on the shaft and free to swing independently thereof, means for operating the clutches to release the wings, and a target pivoted on the vane and having operative connection with the clutch operating means.

3. In a wind motor, a vertical shaft, supports mounted on the shaft and rotating therewith, a vane, an element supporting the vane, vertical wings pivoted on the supports, means for rotating the wings having operative connection with the said supporting element, and means controlled by an excessive speed of rotation of the motor for shifting the vane supporting element, means operated by the element for changing the angularity of the wings with relation to the wind and to reduce the speed of rotation of the motor.

4. In a wind motor, a vertical shaft, supports mounted on the shaft and rotating therewith, a vane, an element supporting the vane, vertical wings pivoted on the supports, means for rotating the wings having operative connection with the said supporting element, and a rudder carried by the vane and controlled by an excessive speed of rotation of the motor for shifting the vane supporting element, means operated by the element for changing the angularity of the wings with relation to the wind and to reduce the speed of rotation of the motor.

5. In a wind motor, a vertical shaft, supports mounted on the shaft and rotating therewith, a vane, an element supporting the vane, vertical wings pivoted on the supports, means for rotating the wings having operative connection with the said supporting element, a rudder carried by the vane and controlled by an excessive speed of rotation of the motor for shifting the vane supporting element, means operated by the element for changing the angularity of the wings with relation to the wind and to reduce the speed of rotation of the motor, and wind controlled means for automatically releasing the wings from their rotating means.

6. In a wind motor, the combination of a vertical shaft, spiders fastened on the shaft and rotating therewith, eccentrically pivoted wings mounted on the spiders, a sleeve free to rotate on the shaft, a vane connected with the sleeve, means for transmitting rotation to the wings having connection with the sleeve, clutches connecting the wings and the operating means, means for actuating the clutches, a wind target pivoted on the vane and having connection with the clutch actuating means, means for restricting the operation of the target, a rudder blade mounted on the vane, and means for automatically controlling the rudder.

7. In a wind motor, the combination of a vertical shaft, a pair of horizontal supports rotatably mounted on the shaft, upright wings rotatably mounted between the supports and confined against vertical movement relatively of said horizontal supports, clutch elements carried by the wings, said wings being pivoted at their upper and lower ends off center, clutches carried by one of the horizontal supports and normally engaging the clutch elements, and a wind actuated member connected with the clutches for disengaging them from the clutch elements to free the wings.

8. In a wind motor, the combination of a vertical shaft, a pair of horizontal supports rotatably mounted on the shaft, upright wings rotatably mounted between the supports and confined against vertical movement relatively of said horizontal supports, clutch elements carried by the wings, said wings being pivoted at their upper and lower ends off center, clutches carried by one of the horizontal supports and normally engaging the clutch elements, a wind actuated member connected with the clutches for disengaging them from the clutch elements to free the wings, a chain for rotating the wings, and sprocket wheels carried by the clutches and engaged by the chain.

9. In a wind motor, the combination of a vertical shaft, a pair of horizontal supports rotatably mounted on the shaft, upright wings eccentrically pivoted between the supports and confined against vertical and lateral displacement relatively of the supports, clutch elements carried by the upper pivots of the wings, clutches carried by the upper support and normally engaging the clutch elements, a wind actuated operating member, a common operating device operated by said member, and operating connections between the operating device and the clutches.

10. In a wind motor, the combination of a vertical shaft, a pair of horizontal supports rotatably mounted on the shaft, upright wings eccentrically pivoted between the horizontal supports and confined against vertical and lateral displacement relatively thereof, whereby each wing normally presents a greater area at one side of its pivots than it does at the other side thereof, a rotatable supporting member mounted on the shaft, a wind vane mounted intermediate its ends on said member, a rudder blade pivoted on one end of said vane, speed controlled means for swinging the blades relatively of the vane for causing a shifting of the latter and a rotation of the supporting member relatively of the horizontal supports, a sprocket chain for rotating the wings, a driving connection for the chain, and means carried by the supporting member for operating the driving connection.

11. In a wind motor, the combination of a vertical shaft, a pair of horizontal supports rotatably mounted on the shaft, upright wings eccentrically pivoted between the horizontal supports and confined against vertical and lateral displacement relatively thereof, whereby each wing normally presents a greater area at one side of its pivots than it does at the other side thereof, a rotatable supporting member mounted on the shaft, a wind vane mounted intermediate its ends on said member, a rudder blade pivoted on one end of said vane, speed controlled means for swinging the blades relatively of the vane for causing a shifting of the latter and a rotation of the supporting member relatively of the horizontal supports, a sprocket chain for rotating the wings, a driving connection for the chain, means carried by the supporting member for operating the driving connection, clutches for fastening the wings against rotation independently of the horizontal supports, and means for releasing the wings, whereby they are free to swing independently of the horizontal supports.

12. In a wind motor, the combination of a vertical shaft, a pair of horizontal supports rotatably mounted on the shaft, upright wings eccentrically pivoted between the horizontal supports and confined against vertical and lateral displacement relatively thereof, whereby each wing normally presents a greater area at one side of its pivots than it does at the other side thereof, a sleeve mounted to rotate on the shaft, a vane integral with the sleeve, a rudder blade pivoted on the vane, a pinion integral with the sleeve, a swinging member connected with the vane, a gear mounted on the swinging member and meshing with the pinion, a driving sprocket wheel connected with said gear, sprocket wheels connected with the upper pivots of the wings, a sprocket chain passing over the wing sprocket wheels and the driving sprocket wheel, and means for adjusting the angularity of the rudder blade with relation to the vane for shifting the same and also for positioning the wings with relation to the direction of the wind.

In testimony whereof I affix my signature.

WILLIAM B. CHENOWETH.